R. N. WERSTLER.
TRANSPLANTING MACHINE.
APPLICATION FILED JAN. 13, 1916.

1,192,140.

Patented July 25, 1916.
2 SHEETS—SHEET 1.

Witness
Robert O. Karcher

Inventor
Roy N. Werstler
By F. W. Bond
Attorney

R. N. WERSTLER.
TRANSPLANTING MACHINE.
APPLICATION FILED JAN. 13, 1916.
1,192,140.
Patented July 25, 1916.
2 SHEETS—SHEET 2.
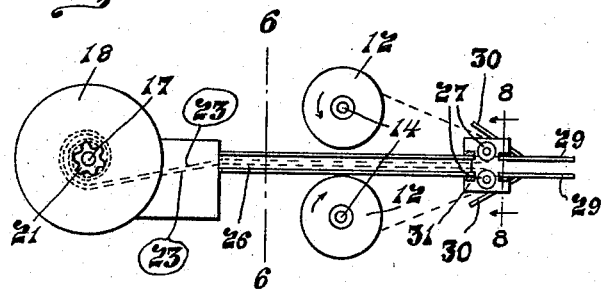
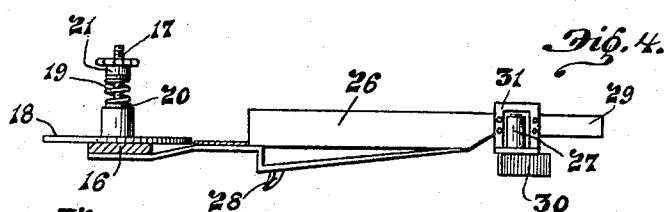
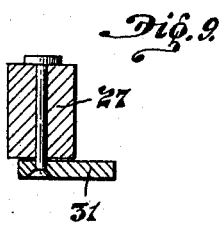
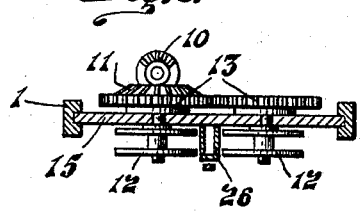
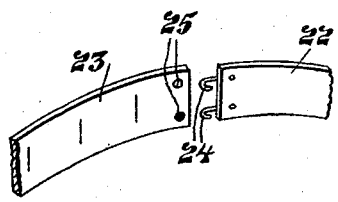
Witness
Robert O. Karcher
Inventor
Roy N. Werstler
By F. W. Bond
Attorney

UNITED STATES PATENT OFFICE.

ROY N. WERSTLER, OF HARTVILLE, OHIO, ASSIGNOR OF ONE-HALF TO THE H. L. HURST MANUFACTURING COMPANY, OF CANTON, OHIO, A CORPORATION OF OHIO.

TRANSPLANTING-MACHINE.

1,192,140.  Specification of Letters Patent.  Patented July 25, 1916.

Application filed January 13, 1916. Serial No. 71,815.

*To all whom it may concern:*

Be it known that I, ROY N. WERSTLER, a citizen of the United States, residing at Hartville, in the county of Stark and State of Ohio, have invented a new and useful Transplanting-Machine, of which the following is a specification.

My invention relates to improvements in transplanting machines in which two tapes or plant holding strips are employed and the plants held between the tapes or strips until they are brought to the point designed to be deposited intermittently.

The objects of the present invention are, first, to simplify the construction of transplanting machines, second, to provide means whereby a number of plants may be placed in the machine, third, to provide means whereby the plants can be released from the tape or strip holding means, and fourth, to provide means for taking up the tape or strips after the plants have been placed in position.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

Figure 1:
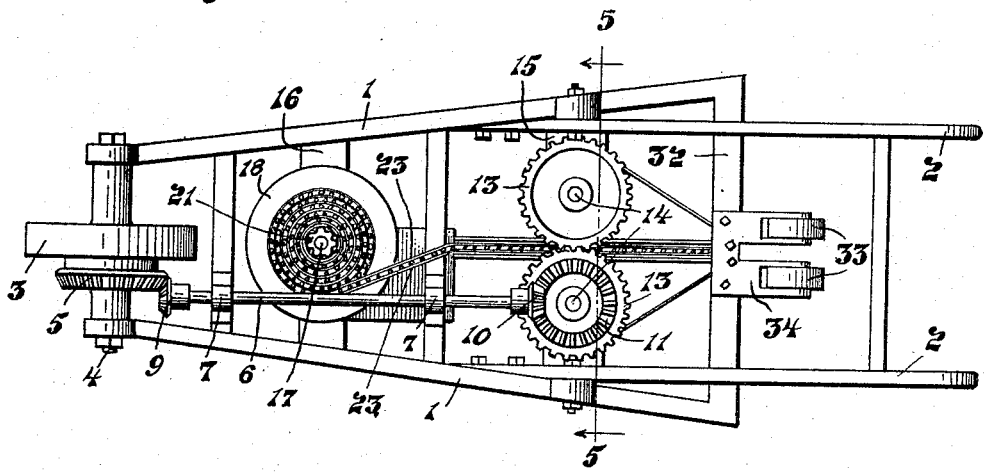
Figure 2:
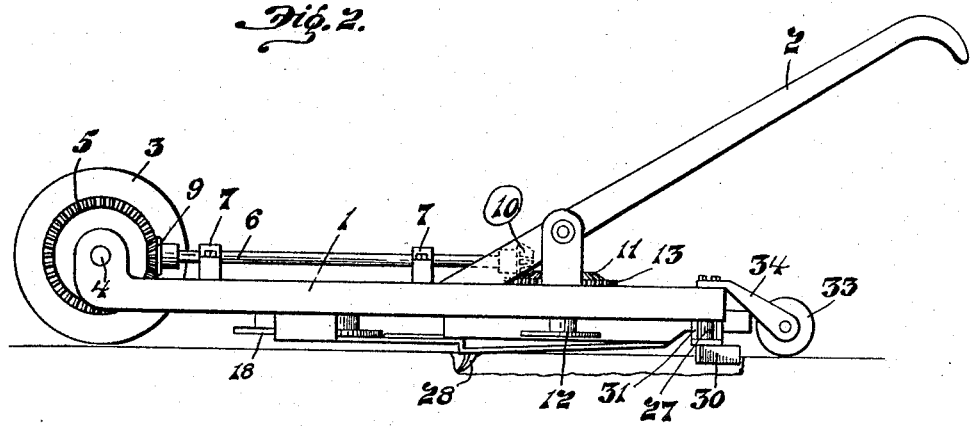

In the accompanying drawings: Figure 1 is a top view showing the general arrangement of the various parts. Fig. 2 is a side elevation. Fig. 3 is a top skeleton view. Fig. 4 is a side view showing parts removed. Fig. 5 is a section on line 5—5, Fig. 1. Fig. 6 is a section on line 6—6, Fig. 3. Fig. 7 is a detached view of a portion of one of the plant holding tapes or strips and a portion of the connecting strip. Fig. 8 is a section on line 8—8, Fig. 3. Fig. 9 is a section through one of the guide rolls.

Similar numerals of reference indicate corresponding parts throughout all the figures of the drawings.

In the accompanying drawing, 1 represents the frame which is made up of the usual side and cross members which are connected together in any well known manner. The particular construction of the frame to which the various moving parts are attached does not have to do particularly with the present invention, except that the frame should be so arranged that the various movable parts can be assembled to co-act to produce the desired results. To the frame 1 are attached the handles 2, which handles are of the usual construction. At the front or forward end of the frame 1 is located the traveling wheel 3, which wheel is rigidly mounted upon the shaft 4, which shaft is journaled in any convenient and well known manner. At the side of the wheel 3 is located the beveled gear wheel 5 which beveled gear wheel should be rigidly connected to the traveling wheel 3. This may be done by forming the wheel 3 and 5 in a single piece or connecting them together in any convenient and well known manner. The shaft 6 is journaled in suitable bearings 7 connected to the frame 1, the forward end of said shaft being provided with the beveled gear wheel 9, which meshes with the gear wheel 3. Upon the opposite or rear end of the shaft 6 is securely mounted the mutilated gear 10, which mutilated gear meshes with the beveled gear 11, said mutilated gear 10 being for the purpose of imparting rotary movement to the gear wheel 11, which in turn imparts intermittent rotary movement to the take-up spools 12 by means of the face gears 13. The take-up spools 12 are securely mounted upon the shafts 14, said shafts being journaled in the cross plate or bar 15. The frame 1 is provided with the cross plate 16 or its equivalent, to which cross plate is attached the post 17, upon which post is located the magazine spool 18, which magazine spool is formed of sufficient size to carry the desired number of convolutions of the plant holding tapes or strips between which tapes or strips are located at the desired intervals the plants desired to be planted. For convenience these strips or tapes can be provided with suitable designating marks at the desired intervals apart, reference being had to the distance the plants are to be apart when placed in the ground.

The magazine spool 18 is loosely mounted upon the post 17, which post provides a suitable bearing for said spool. It will be understood that in practical use the two strips of tape should be held taut and in order to accomplish this the spring 19 is provided, which spring rests upon a suitable washer 20 located upon the magazine spool 18 and for the purpose of regulating the tension the top or upper end of the post should be screw threaded and provided with the tension nut 21. In order to couple up the plant holding tapes or strips with the take-up wheels 12 I prefer to use attaching strips 22, one end of each attaching strip being connected in any convenient and well known manner to take up spools and their opposite ends detachably connected to the plant holding tapes or strips 23 by the hooks 24 and the eyes 25 or their equivalents. It will be understood that it is immaterial as to just how the connecting strips and the tapes are connected together. The tapes or strips 23, together with the plants are moved through the trough 26, said tapes or strips being located around the guide rolls 27, which guide rolls are located near the rear end of the trough 26, by which arrangement the pull of the take-up spools 12 will separate the tapes or strips 23, at which time the plants are released from the grip of said tapes and permitted to drop by gravity into the furrow previously prepared by the shovel 28.

In order to prevent the plants from tilting or falling flat upon the ground the rearwardly extending spaced plates 29 are provided, which may be continued from the trough 26. For the purpose of covering the furrow the covering blades 30 are provided which are connected to the yoke 31, which yoke is connected to the rear cross bar 32 of the frame 1. For the purpose of supporting the machine proper the rear traveling wheels 33 are provided, which are journaled in the frame 34.

In use the machine proper is pushed forward or in large machines it may be drawn by horses, and if drawn by horses suitable connection should be provided at the forward end of the machine proper, but as such parts have nothing to do with the present invention they are not illustrated.

It will be understood that the covering blades 30 will move the ground toward the furrow made by the shovel 28, which covering blades should be so adjusted that a sufficient amount of dirt will be conveyed to properly bury the plants the depth desired.

The present invention has relation more specifically to the planting of celery plants, but by slight modifications or adjustments the same general arrangement of the parts can be used for transplanting various kinds of plants.

It will be understood that the bottom or lower edges of the plates 29 should be in a plane above the bottom of the trough 26 in order that the furrow filling shovels or blades 30 may be located below the bottom edge of said plates in order that they can move the dirt toward the plants, said dirt being forced under the lower edges of the spaced plates.

Having fully described my invention what I claim as new and desire to secure by Letters Patent, is:

1. In a transplanting machine, the combination of a frame, a trough carried by the frame, a shovel located at the front end of the trough, a magazine spool carried by the frame, said magazine spool located in front of the trough and means for tensioning the magazine spool, take-up wheels carried by the frame, means for imparting intermittent rotary motion to the take-up wheels, two tapes adapted to be located face to face, means for connecting said tapes to the take-up wheels, guide rolls adapted to space the tapes, all arranged, substantially as and for the purpose specified.

2. In a transplanting machine, the combination of a frame, a trough carried by the frame, a shovel located at the front end of the trough, a magazine spool carried by the frame, said magazine spool located in front of the trough and means for tensioning the magazine spool, take-up wheels carried by the frame means for imparting intermittent rotary motion to the take-up wheels, two tapes adapted to be located face to face, means for connecting said tapes to the take-up wheels, guide rolls adapted to space the tapes, spaced plates located at the rear of the trough and converging blades located in a plane below the trough.

3. In a transplanting machine, the combination of a traveling frame, a magazine spool carried by the frame, means for frictionally holding the magazine spool against free rotation, two plant carrying tapes adapted to be located face to face and wound upon the magazine spool, guide rolls adapted to separate the plant carrying tapes and two take-up wheels adapted to intermittently move the plant carrying tapes and means for imparting intermittent rotary motion to the take-up wheels, a trough located intermediate the guide rolls and the magazine spool and a shovel located in a plane below the trough and covering blades located behind the trough.

4. In a transplanting machine, the combination of a traveling frame, a magazine spool carried by the frame, means for frictionally holding the magazine spool against free rotation, two plant carrying tapes adapted to be located face to face provided with plant spacing designations, and wound upon the magazine spool, guide rolls adapted to separate the plant carrying tapes and two take-up wheels adapted to intermittently move the plant carrying tapes and means for imparting intermittent rotary motion to the take-up wheels, a trough located intermediate the guide rolls and the magazine spool and a shovel located in a plane below the trough and covering blades located behind the trough.

5. In a plant transplanting machine, the combination of a traveling frame, a magazine spool carried by the frame, means for frictionally holding the magazine spool against free rotation, two plant carrying tapes located face to face, take-up wheels, means for connecting the two tapes to the take-up wheels, a trough adapted to carry the plant carrying tapes, a furrow shovel located at the forward end of the trough and covering blades located at the rear end of the trough and means for separating the tapes and means for imparting intermittent rotary motion to the take-up wheels.

6. In a plant transplanting machine, the combination of a traveling frame, a magazine spool carried by the frame, means for frictionally holding the magazine spool against free rotation, two plant carrying tapes located face to face, take-up wheels, means for connecting the two tapes to the take-up wheels, a trough adapted to carry the plant carrying tapes, a furrow shovel located at the forward end of the trough and covering blades located at the rear end of the trough and means for separating the tapes, means for imparting intermittent rotary motion to the take-up wheels, and spaced plates located at the rear of the trough, the bottom edges of said plates located in a plane above the bottom of the trough.

7. In a plant transplanting machine, the combination of a traveling frame, a magazine spool carried by the frame, means for holding the magazine spool against rotation, two plant carrying tapes located face to face, take-up wheels adapted to intermittently actuate the plant carrying tapes, a trough adapted to carry the plant carrying tapes, a furrower located in front of the trough and covering blades located at the rear of the trough.

In testimony that I claim the above, I have hereunto subscribed my name.

ROY N. WERSTLER.

Copies of this patent may be obtained for five cents each, by addressing the "Commissioner of Patents, Washington, D. C."